United States Patent [19]

Brüderle

[11] Patent Number: 4,746,085

[45] Date of Patent: May 24, 1988

[54] METHOD FOR DETERMINING THE EARTH'S MAGNETIC FIELD AND A SATELLITE'S ATTITUDE FOR ATTITUDE CONTROL

[75] Inventor: Ernst Brüderle, Ottobrunn, Fed. Rep. of Germany

[73] Assignee: Messerschmitt-Bölkow-Blohm GmbH, Munich, Fed. Rep. of Germany

[21] Appl. No.: 19,485

[22] Filed: Feb. 26, 1987

[30] Foreign Application Priority Data

Feb. 28, 1986 [DE] Fed. Rep. of Germany ....... 3606636

[51] Int. Cl.$^4$ ............................................... B64G 1/32
[52] U.S. Cl. ..................................................... 244/166
[58] Field of Search ....................... 244/164, 166, 171; 324/247

[56] References Cited

U.S. PATENT DOCUMENTS

| 3,189,298 | 6/1965 | Buckingham et al. | 244/166 |
| 3,834,653 | 9/1974 | Perkel | 244/166 |
| 4,010,921 | 3/1977 | Pistiner et al. | 244/166 |

Primary Examiner—Joseph F. Peters, Jr.
Assistant Examiner—Rodney Corl
Attorney, Agent, or Firm—Toren, McGeady & Associates

[57] ABSTRACT

A method for determining the earth's magnetic field and, selectively, additionally, for determining a satellite orientation as a premise for the attitude control of an earth satellite in a known orbit. The satellite is equipped with magnetic coils 5, 6, and 7, gyros, sun sensors and reaction and/or flywheels 1, 2, 3, 4. The x-axis of a coordinate system integral with the satellite is continuously oriented towards the sun. The satellite can be rotated through a variable angle of rotation $\alpha$ around the x-axis. At three instants $t_0$, $t_1$, $t_2$, spaced from each other by small time intervals, respective angular momentum components $H_y$, $H_z$ are measured. Herein, a constant magnetic moment $M_x$ is generated throughout the second time interval. From these domains, the components of the earth's magnetic field $B_y$, $B_z$ are calculated for $t_0$. From this, subsequently, the angle of rotation $\alpha$ can be determined. The components of the angular momentum result from the rpm's of the reaction and/or flywheels, as well as gyros.

4 Claims, 1 Drawing Sheet

METHOD FOR DETERMINING THE EARTH'S MAGNETIC FIELD AND A SATELLITE'S ATTITUDE FOR ATTITUDE CONTROL

BACKGROUND OF THE INVENTION

1. Field of the Invention

The invention is directed to a method for determining the earth's magnetic field and satellite orientation for the attitude control of a satellite, equipped with magnetic coils, gyros, sunsensors and reaction, and/or flywheels, in a known earth orbit, which is permanently aligned to the center of the sun with the x-axis of the coordinate system (x, y, z) integral with the satellite and which, with respect to an absolute reference coordinate system (X, Y, Z) whose X-axis coincides with the x-axis, is rotated around said x-axis at an instant $t_0$ through an angle of rotation $\alpha$ as well as being allowed to rotate with an angular velocity $\omega$.

2. Description of Related Art

A satellite of such a type is, for instance, the ROSAT, which is in a relatively low earth orbit distinctly inclined with respect to the equatorial plane. This satellite has the task of scanning space for x-ray sources. The attitude control system thereof is arranged so that the satellite has one of its sides always facing the sun. A solar sensor assures that the satellite is always oriented with the x-axis of its coordinate system (x, y, z), which is integral with the satellite, in a direction toward the center of the sun. Deviations detected by the solar sensor are immediately corrected by the attitude control system. The satellite can, however, assume a random angular position around this x-axis; it can even rotate slowly. The angular position resulting therefrom is unknown to begin with, since no sensors relating thereto are present. The attitude control system utilizes magnetic coils, gyros and reaction wheels. For instance, three magnetic coils, respectively oriented in the directions of the coordinate axes, x, y and z integral with the satellite, may be present, which respectively build up a magnetic moment if electric current flows through them. These magnetic moments generate, in interaction with the earth's magnetic field, appropriate torques for attitude control or for reduction or build-down of excessive angular momentum of the reaction wheels. In order to activate the magnetic coils in a suitable manner, it must, however, be known the direction of the earth's magnetic field at the momentary orbit point in the satellite coordinate system. The orbit is known, as is also known, basically, the earth's magnetic field to be encountered there as far as magnitude and direction are concerned. However, to begin with, it is not yet known, because of the unknown angle of rotation of the satellite around the X-axis, what relative orientation the vector of the earth's magnetic field at the individual points in the track has with respect to the coordinate system integral with the satellite, and thus, the respect to the direction of the producible magnetic moments. This knowledge is, however, a factor for the controlled generation of correction torques by interaction of the generated magnetic moments with the earth's magnetic field.

A satellite attitude control system which utilizes flywheels, as well as, magnetic coils is known from U.S. Pat. No. 3,189,298. There, the problem of unloading or removing unwanted angular momentum by causing correction torques of a suitable level to be generated by interaction between the earth's magnetic field with the magnetic moments produced in the satellite, is discussed. Such unwanted angular momentum can accumulate in the reaction wheels, since external disturbance torques must continuous be compensated by the attitude control system. The rpm's of the reaction wheels may not, however, exceed specific upper limits. Therefore, they must, always be kept within a normal range, meaning the excessive angular momentum shares must be unloaded or cancelled.

In order to achieve this, the magnetic coils must be supplied with current in a specific manner according to a known law depending on the rotational impulse to be unloaded, as well as, the earth's magnetic field (consult U.S. Pat. No. 3,189,298, as well as, the book "Torques and Attitude Sensing in Earth Satellites", published by S. Fred Singer, New York/London 1964, pages 140 to 142, concerning a magnetic moment produced by this current). This law reads:

$$M = K(B \times H) \tag{1}$$

where M is the magnetic moment produced by the magnetic coil, B is the vector of the earth magnetic field, H is the vector of the rotational impulse to be unloaded, and K is a constant. This law is, however, based on the orientation of the B-vector, and the H-vector being known. In the case of the attitude control system in U.S. Pat. No. 3,189,298, a magnetometer is used for measuring the earth's magnetic field, with which its components, with respect to the coordinate system integral with the satellite, can be determined. The inclusion of such a magnetometer, however, adds a certain expense, as far as apparatus is concerned.

SUMMARY OF THE INVENTION

The object of the subject invention is, therefore, to provide a method of the previously mentioned type, with which the components of the earth's magnetic field in the coordinate system integral with the satellite, as well as the angle of rotation $\alpha$ of the satellite around the x-axis, oriented towards the sun, are determinable, without using a magnetometer or other magnetic field sensors, which routinely are used for determination of such an angle of rotation. In this method, one merely makes use of the circumstance that the earth orbit of the satellite, as well as the earth magnetic field vectors existing there, are known with respect to an absolute reference coordinate system.

The invention advances the technical teaching that, to begin with, the angular momentum components $H_Y$ and $H_Z$ of the satellite are to be measured at the beginning and end of a short time interval $\Delta t_1$, whereby for the duration of this time interval $\Delta t_1$, no magnetic moment is generated by the magnetic coils. Within this time interval, an appropriate change of the rotational impulse will occur if an external disturbance torque $M_S$ is present. This change will manifest itself in the two measured values $H_y$ and $H_z$ at the start and end of the time interval $\Delta t_1$. In a directly ensuing or subsequent second short time interval $\Delta t_2$, a magnetic coil oriented in the direction of the x-axis or is supplied with current, so that a magnetic moment $M_x$ is generated in the direction of this axis. In addition to the effects of the external disturbance torque $M_S$ on the change of the angular momentum H, the effect produced by the interaction of the generated magnetic moment $M_x$ with the earth magnetic field B, must now be added. In order to determine this effect, measurement of the angular momentum components $H_y$ and $H_z$ is accomplished at the end of the second time interval $\Delta t_2$. Because of the differing conditions within the two time intervals, differing changes of the angular momentum components arise. Hence, the effects of the earth magnetic field B during the second time interval can be isolated from the influence of the external disturbance moments present during both time intervals. If the time intervals are made sufficiently short, the external disturbance torque $M_S$ can realistically be considered as constant.

The invention is based on the recognition that in Physics, a very specific change of the angular momentum H is caused by the interaction of the known magnetic moment $M_x$ generated within the second time interval $\Delta t_2$, with the earth's magnetic field B, and that one can make an explicit conclusion from this change onto the vector B of the earth's magnetic field. If, thus, the components of the angular momentum in the coordinate system integral with the satellite, are measured at the start and the end of the timing interval $\Delta t_2$, there results the change of the angular momentum vector H which has occurred within this time interval. Since, additionally, an external disturbance torque $M_S$ may be present, its influence must be determined within an additional time interval $\Delta t_1$.

Use of a mathematical formulation of the physical-technical procedure described above, leads, initially, to the following basic system of equations, which show the change of the angular momentum components $H_x$, $H_y$ and $H_z$, as a function of external torques:

$$\dot{H}_x = M_{Sx} + M_y B_z - M_z B_y$$

$$\dot{H}_y = -\omega H_z + M_{Sy} + M_z B_x - M_x B_z$$

$$\dot{H}_z = \omega H_y + M_{Sz} + M_x B_y - M_y B_x \quad (2)$$

Herein, $M_{Sx}$ etc., designate the components of the external disturbance torque $M_S$ in the directions of the coordinate axes integral with the satellite; $M_x$ etc., designate the magnetic moments generated by the solenoids in the satellite; $B_x$ etc., designate the components of the earth's magnetic field; and $\omega$ designates the angular velocity of the satellite around the x-axis.

If the equations (2) are integrated over this time interval $\Delta t_1$, assuming $M_x = M_y = M_z = 0$, and with the additional realistic assumption that the disturbance torque components $M_{Sx}$ etc., are constant within the small time interval $\Delta t_1$, then we obtain the following:

$$H_x(t_1) = H_x(t_0) + M_{Sx}\Delta t_1$$

$$H_y(t_1) = H_y(t_0) + \omega\Delta t_1 H_z(t_0) + M_{Sy}\Delta t_1$$

$$H_z(t_1) = H_z(t_0) - \omega\Delta t_1 H_y(t_0) + M_{Sz}\Delta t_1 \quad (3)$$

By integration of the equations (2) over an ensuing small time interval $\Delta t_2$, with the assumption $M_x =$ constant, $M_y = M_z = 0$, and with the additional assumption that the disturbance torque components $M_{Sx}$ etc., and the magnetic field components $B_y$ and $B_z$ are constant throughout the time interval $\Delta t_2$, one obtains:

$$H_x(t_2) = H_x(t_1) + M_{Sx}\Delta t_2$$

$$H_y(t_2) = H_y(t_1) + \omega\Delta t_2 H_z(t_1) + M_{Sy}\Delta t_2 - M_x B_z \Delta t_2$$

$$H_z(t_2) = H_z(t_1) - \omega\Delta t_2 H_y(t_1) + M_{Sz}\Delta t_2 + M_x B_y \Delta t_2 \quad (4)$$

Solving the last two equations (4) for $B_y$ and $B_z$, and substituting the disturbance torque components $M_{Sy}$ and $M_{Sz}$ from the equations (3), one obtains, finally:

$$B_y(t_0) = Q_2\{H_z(t_2) - Q_{31}H_z(t_1) + Q_{21}H_z(t_0) + \omega\Delta t_2[H_y(t_1) - H_y(t_0)]\} \quad (5)$$

$$B_z(t_0) = Q_2\{-H_y(t_2) + Q_{31}H_y(t_1) - Q_{21}H_y(t_0) + \omega\Delta t_2[H_z(t_1) - H_z(t_0)]\}$$

where $Q_2 = 1/(M_x\Delta t_2)$, $Q_{31} = \Delta t_3/\Delta t_1$ and $Q_{21} = \Delta t_2/\Delta t_1 \Delta t_3 = t_2 - t_0 = \Delta t_1 + \Delta t_2$. If $\Delta t_1 = \Delta t_2 = \Delta t$, then the following simplified equations result:

$$B_y(t_0) = Q\{H_z(t_2) - 2H_z(t_1) + H_z(t_0) + \omega\Delta t[H_y(t_1) - H_y(t_0)]\}$$

$$B_z(t_0) = Q\{-H_y(t_2) + 2H_y(t_1) - H_y(t_0) + \omega\Delta t[H_z(t_1) - H_z(t_0)]\} \quad (6)$$

where $Q = 1/(M_x\Delta t)$.

The mathematical correlation between the earth's magnetic field components $B_x$ etc. to be determined, in the coordinate system integral with the satellite, and the known components $B_X$ etc., in the absolute reference coordinate system, is, in the present case, given by the following system of equations:

$$B_x(t) = B_X(t)$$

$$B_y(t) = B_Y(t)\cos\alpha + B_Z(t)\sin\alpha$$

$$B_z(t) = -B_Y(t)\sin\alpha + B_Z(t)\cos\alpha \quad (7)$$

It is assumed here that we are dealing with two cartesian coordinate systems, which coincide as far as their x- or X-axes are concerned and which are rotated around these axes with respect to each other through an angle $\alpha$. The absolute reference coordinate system may, for instance, be of such a type, in which the X-axis is also oriented in a direction toward the center of the sun, the Y-axis parallel to the terrestrial orbit plane, and the Z-axis perpendicular to the terrestrial orbit plane.

Finally, there results the following from the system of equations (7) for the rotational angle $\alpha$:

$$\cos\alpha = \frac{B_y(t_0)B_Y(t_0) + B_z(t_0)B_Z(t_0)}{B_Y^2(t_0) + B_Z^2(t_0)} \quad (8)$$

and $$\sin\alpha = \frac{B_y(t_0)B_Z(t_0) - B_z(t_0)B_Y(t_0)}{B_Y^2(t_0) + B_Z^2(t_0)}$$

It results from the above mathematical derivations, that the entire interval $\Delta t_3$ must be selected to be so short that, in addition to the disturbance torque components $M_{Sx}$ etc., (see Equation 4) the earth's magnetic field B can also be considered as constant. Therefore, the following applies: $B(t_0) = B(t_1) = B(t_2)$. Furthermore, it is assumed that the angular velocity $\omega$ of the satellite around the x- or X-axis during the time interval $\Delta t_3$ is constant and so small that the angle of rotation $\alpha$ changes only slightly during this time interval. Finally, it is assumed that the angular momentum change is small compared to the H itself, so that said angular momentum H can be considered to be constant for the integration. This is dependent, on the one hand, on the suitable selection of the two time intervals, as well as, on the other hand, on the accuracy with which angular momentum components, and their change, can be measured.

In case of a non-rotating satellite, its angular momentum is given as the sum of vectors of the individual angular momentum of the reaction or flywheels. For determination of the angular momentum components, the rpm's of these reaction wheels must be measured and their moments of inertia must be known. The gyro system is used for measurement of the angular velocity $\omega$.

If, for instance, it is intended to unload or cancel an excessive angular momentum, then the three angular momentum component measurements can be performed directly prior to the instants $t_0$, $t_1$ and $t_2$. The angle $\alpha$ can be considered as constant provided the unloading process is not extended for a time period too large compared to $\Delta t_3$, so that merely the components of the earth's magnetic field $B_y$ and $B_z$ have to be computed according to Equation (5), not, however, in addition the angle $\alpha$ according to Equation (8). It may, however, also be necessary to calculate this angle $\alpha$ additionally and to include in the calculation its changeability as a function of time $\alpha(t)$, according to:

$$\alpha(t) = \alpha + \omega t \quad (9)$$

This timewise variable $\alpha(t)$ then is also inserted into the system of Equations (7), which reflects the interrelationship of the components of the earth's magnetic field in the two coordinate systems (x, y, z) and (X, Y, Z). For instance, the angle $\alpha$ must be calculated if the unloading of the angular momentum or an attitude control command to be performed under activation of the magnetic coils, is to occur at a specific time interval from instant $t_2$, and/or is to extend over a longer period of time, so that it can be assumed that the angle $\alpha(t)$ changes noticeably in the course of this time period. Here, the magnitude of the angular velocity $\omega$ has to be paid attention to which is to be measured, for instance, by the gyro system.

BRIEF DESCRIPTIONS OF THE DRAWINGS

The invention will now be described with reference to the accompanying drawing, in which:

FIG. 1 is an arrangement of reaction wheels and magnetic coils, as well as a solar sensor in a coordinate system integral with the satellite; and FIG. 2 is a satellite in earth orbit.

DESCRIPTION OF THE PREFERRED EMBODIMENT

Figure 1:
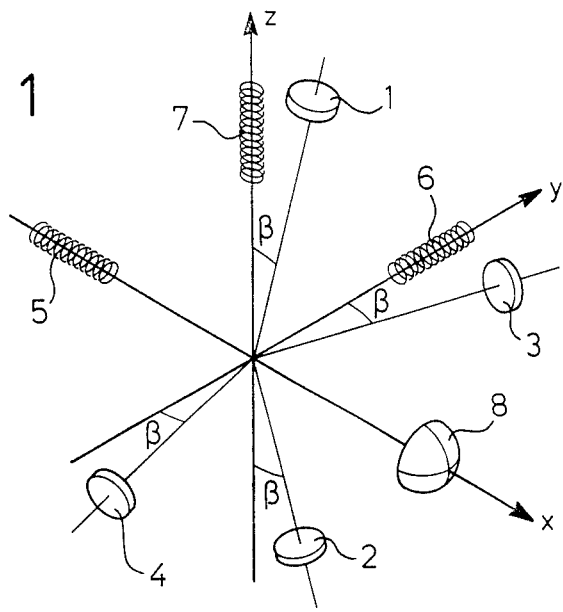

FIG. 1 shows, schematically, a coordinate system x, y, z, with four reaction wheels 1 to 4, in an arrangement as used in the previously mentioned satellite ROSAT, three magnetic coils 5, 6, and 7, and a solar sensor 8. The solar sensor 8 is oriented in the direction of the x-axis; the three magnetic coils 5, 6, and 7, are positioned along the three axes x, y, z, integral with the satellite, and, when activated, generate magnetic moments $M_x$, $M_y$ and $M_z$. The axes of rotation of two respective reaction wheels 1 and 2, as well as 3 and 4 lie, respectively, in the xz-plane or xy-plane and are inclined by an angle $\beta$ with respect to the positive and negative z- or y-axes. From the respective moments of inertia of the reaction wheels 1 to 4, and their rpm's or angular velocities $\omega_1$ to $\omega_4$, each resulting momentum vector H can be calculated by vectorial addition. For this, measuring devices (not shown) for the corresponding rpm's are used. The solar sensor 8 has a line of sight along the x-axis, which is to be continuously oriented towards the center of the sun. The solar sensor 8 detects, in the usual manner, deviations of the x-axis integral with the satellite from this required direction, and the downstream attitude control system takes care that such deviations are immediately corrected. This occurs, for instance, by changes in rpm of the appropriate wheels, these changes being of the appropriate magnitudes, or also by activation of the appropriate magnetic coils. Deviations of the x-axis from the required direction can be caused by external disturbance torques, for instance by solar radiation pressure. The then continuously required attitude correction commands can result in one or several of the reaction wheels assuming unallowable rpm ranges. Then an unloading of the corresponding unwanted angular momentum is required, so that the rpm's are restored to the allowable range. This can occur in accordance with the law (1) by generation of appropriate magnetic moments. Here, the invention intervenes for the purpose of the required determination of the components of the earth's magnetic field in the coordinate system integral with the satellite according to law (1), equally, as this can be the case during activation of the magnetic coils for generation of desired attitude control commands in the earth's magnetic field.

Figure 2:
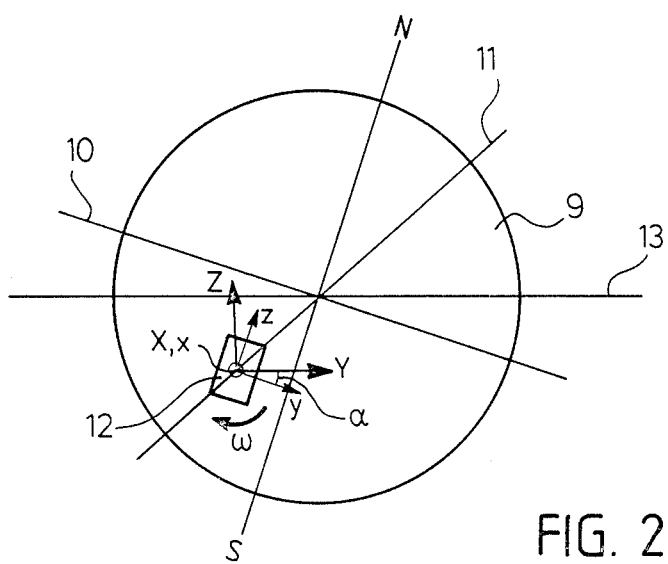

FIG. 2 shows, schematically and viewed from the sun, the earth 9 with a satellite 12 in an orbit 11, inclined with respect to the equatorial plane 10. Therein, the coordinate system x, y, z integral with the satellite is shown, as well as the absolute reference coordinate system X, Y, Z. The Y-axis is parallel to the terrestial orbit plane 13 and the Z-axis is perpendicular thereto. The Y- and Z-axes are rotated through an angle of rotation $\alpha$ with respect to the y- and z-axes. If the satellite 12 rotates with an angular velocity $\omega$ around the x- or X-axis, the angle $\alpha$ is referred to a fixed instant or to a very small time interval $\Delta t_3$, in which the change of the angle $\alpha$ can be negligibly small. Otherwise, the change of the angle $\alpha$ as a function of time at constant angular velocity $\omega$ is given by the equation (9).

While embodiments of the invention have been described in detail, it will be evident that the invention may be embodied otherwise without departing from the spirit and scope of the invention.

What is claimed is:

1. A method for determining the earth's magnetic field, and selectively, a satellite's attitude as a prerequisite for the attitude control of said satellite in a known earth orbit, said satellite including magnetic coils, gyros sun sensors and reaction and/or flywheels, and is continuously oriented with an x-axis of a coordinate system (x, y, z) integral with the satellite directed towards the center of the sun and which, with respect to an absolute reference coordinate system (X, Y, Z) whose X-axis coincides with the x-axis, is rotated around said x-axis, at an instant $t_0$, through an angle of rotation $\alpha$ as well as being able to rotate with an angular velocity $\omega$, characterized in that the method comprises:

measuring, at three instants ($t_0$, $t_1$, $t_2$) succeeding each other and respectively spaced by time intervals $\Delta t_1(t_0 < t < t_1)$ and $\Delta t_2(t_1 < t < t_2)$, angular momentum components ($H_y$, $H_z$) of the satellite oriented perpendicularly to the x-axis, wherein throughout one of the two time intervals, no magnetic moment is generated, while during the other time interval, a constant magnetic moment $M_x$ in direction of the x-axis is generated;

calculating, from the measured angular momentum components $H_y(t_0)$, $H_y(t_1)$, $H_y(t_2)$, $H_z(t_0)$, $H_z(t_1)$ and $H_z(t_2)$, the earth's magnetic field components $B_y(t_0)$ and $B_z(t_0)$, in accordance with the equations:

$B_y(t_0) = Q_2\{H_z(t_2) - Q_{31}H_z(t_1) + Q_{21}H_z(t_0) + \omega\Delta t_2[H_y(t_1) - H_y(t_0)]\}$ $B_z(t_0) = Q_2\{-H_y(t_2) + Q_{31}H_y(t_1) - Q_{21}H_y(t_0) + \omega\Delta t_2\cdot[H_z(t_1) - H_z(t_0)]\}$ with respect to the coordinate system (x, y, z) integral with the satellite wherein $Q_2 = 1/(M_x\Delta t_2)$, $Q_{31} = \Delta t_3/\Delta t_1$, $Q_{21} = \Delta t_2/\Delta t_1$, $\Delta t_3 = t_2 - t_0 = \Delta t_2 + \Delta t_1$, $\Delta t_1 = t_1 - t_0$, $\Delta t_2 = t_2 - t_1$; and selectively calculating the angle of rotation $\alpha$, in accordance with $$\cos\alpha = \frac{B_y(t_0)B_Y(t_0) + B_z(t_0)B_Z(t_0)}{B_Y^2(t_0) + B_Z^2(t_0)}$$

whereby the components of the earth's magnetic field $B_Y(t_0)$ and $B_Z(t_0)$ on the known terrestrial orbit are utilized with reference to the absolute reference coordinate system (X, Y, Z).

2. Method according to claim 1, characterized in that the time interval $\Delta t_1$ and $\Delta t_2$ are chosen to be equal.

3. Method according to claim 1, characterized in that the components of the angular momentum $H_y$ and $H_z$ are determined from measurements of the rpm's of the reaction and/or flywheels as well as the gyros.

4. Method according to claim 2, characterized in that the components of the angular momentum $H_y$ and $H_z$ are determined from measurements of the rpm's of the reaction and/or flywheels as well as the gyros.

* * * * *